United States Patent [19]
Zenda

[11] Patent Number: 5,629,715
[45] Date of Patent: May 13, 1997

[54] DISPLAY CONTROL SYSTEM

[75] Inventor: Hiroki Zenda, Tokyo, Japan

[73] Assignee: Kabushiki Kaisha Toshiba, Kawasaki, Japan

[21] Appl. No.: 118,787

[22] Filed: Sep. 9, 1993

Related U.S. Application Data

[63] Continuation of Ser. No. 578,216, Sep. 6, 1990, abandoned.

[30] Foreign Application Priority Data

| Sep. 29, 1989 | [JP] | Japan | 1-254961 |
| Sep. 29, 1989 | [JP] | Japan | 1-254968 |
| Sep. 29, 1989 | [JP] | Japan | 1-254969 |

[51] Int. Cl.$^6$ .................................................. G09G 5/00
[52] U.S. Cl. ................................. 345/3; 345/211
[58] Field of Search .......................... 364/707, 708, 364/483; 395/162, 500; 307/31, 38, 64; 320/14, 2, 1; 345/1, 3, 84, 60, 132, 204, 211, 2, 212, 213

[56] References Cited

U.S. PATENT DOCUMENTS

| 3,941,989 | 3/1976 | McLaughlin et al. | 340/811 |
| 4,195,431 | 4/1980 | Neufeld | 40/544 |
| 4,747,041 | 5/1988 | Engel et al. | 364/707 |
| 4,760,387 | 7/1988 | Ishii et al. | 340/716 |
| 4,842,378 | 6/1989 | Flasck et al. | 364/708 |
| 4,855,728 | 8/1989 | Mano et al. | 340/717 |
| 4,922,448 | 5/1990 | Kunieda et al. | 340/717 |
| 4,926,166 | 5/1990 | Fujisawa et al. | 340/720 |
| 4,945,335 | 7/1990 | Kimura et al. | 364/708 |
| 4,980,678 | 12/1990 | Zenda | 340/805 |
| 4,980,836 | 12/1990 | Carter | 364/141 |
| 4,998,100 | 3/1991 | Ishii | 340/805 |
| 4,999,794 | 3/1991 | Yakushiji | 364/707 |
| 5,008,846 | 4/1991 | Inoue | 364/707 |
| 5,072,411 | 12/1991 | Yamaki | 395/162 |
| 5,150,109 | 9/1992 | Berry | 345/3 |
| 5,159,683 | 10/1992 | Lvovsky et al. | 395/500 |

FOREIGN PATENT DOCUMENTS

| 0190664 | 8/1986 | European Pat. Off. . |
| 0326275 | 8/1989 | European Pat. Off. . |
| 2053533 | 2/1981 | United Kingdom . |

OTHER PUBLICATIONS

Patent Abstracts of Japan, vol. 7, No. 234 (P-230) Oct. 18, 1983 & JP-A-58 123 118 (Fujitsu K.K.) Jul. 22, 1983.

Paska, T.M.; Device Identification By Test–Signal Duration, IBM Tech. Disclosure, V. 24, No. 1A, Jun. '81 pp. 188 and 189.

*Primary Examiner*—Steven Saras
*Attorney, Agent, or Firm*—Finnegan, Henderson, Farabow, Garrett & Dunner, L.L.P.

[57] ABSTRACT

Circuits are provided for determining the use of a flat panel display such as a liquid crystal display or a plasma display based on a plurality of input conditions. A switch circuit is provided for cutting off the supply of display driving power to the flat panel display unit when the display unit is not in use. Gate circuits are provided for locking a LCD driving signal to a non-driven level when the non-use of the LCD is determined. A display controller controlling the display of a CRT display unit includes a display data conversion table and a plurality of D/A converters. A circuit is provided for inhibiting the supplement of clock pulses to a display data conversion table, when a display auto off is enabled. Circuits are provided for cutting off the reference current of the display signal output to the D/A converters.

37 Claims, 8 Drawing Sheets

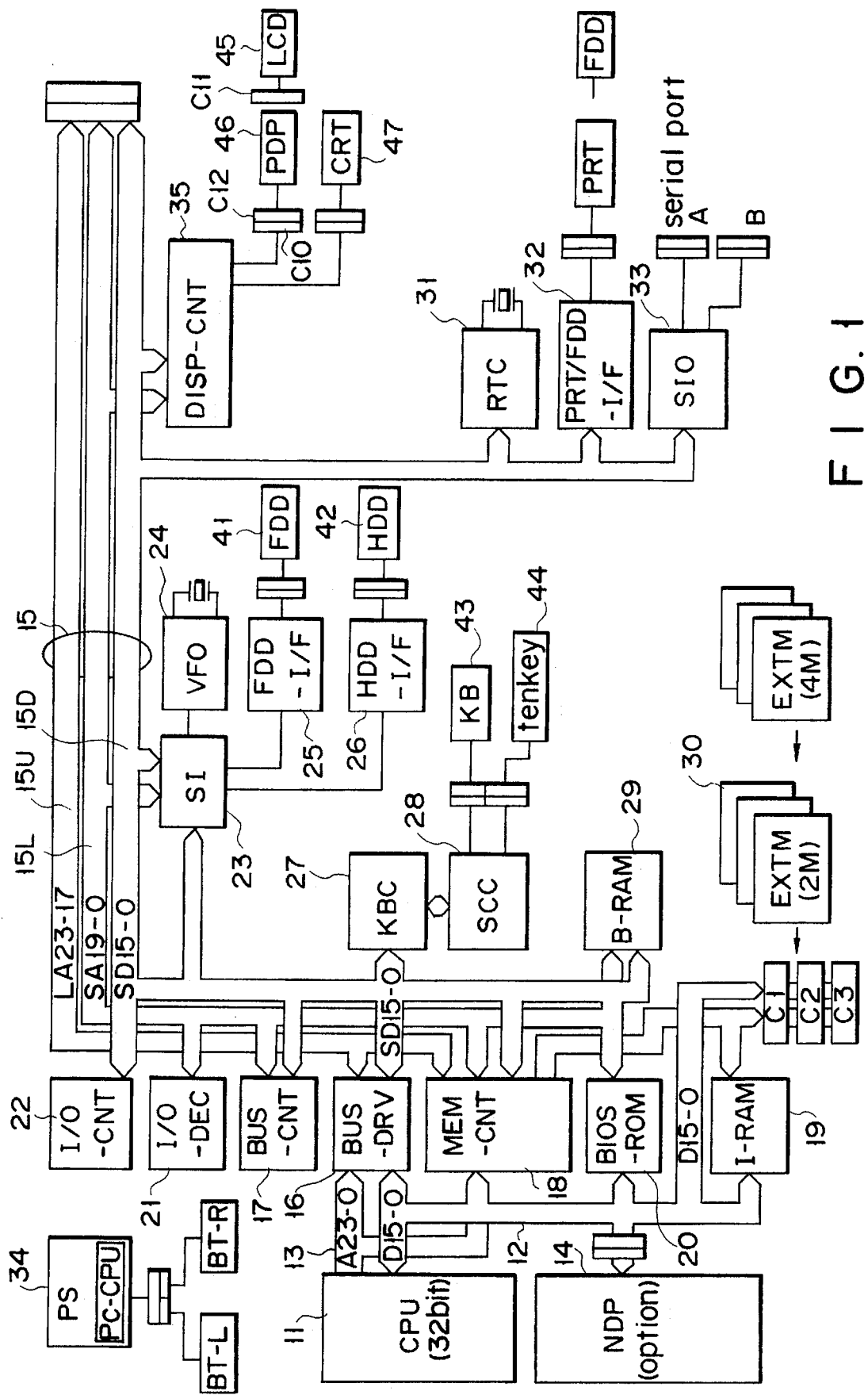
F I G. 1

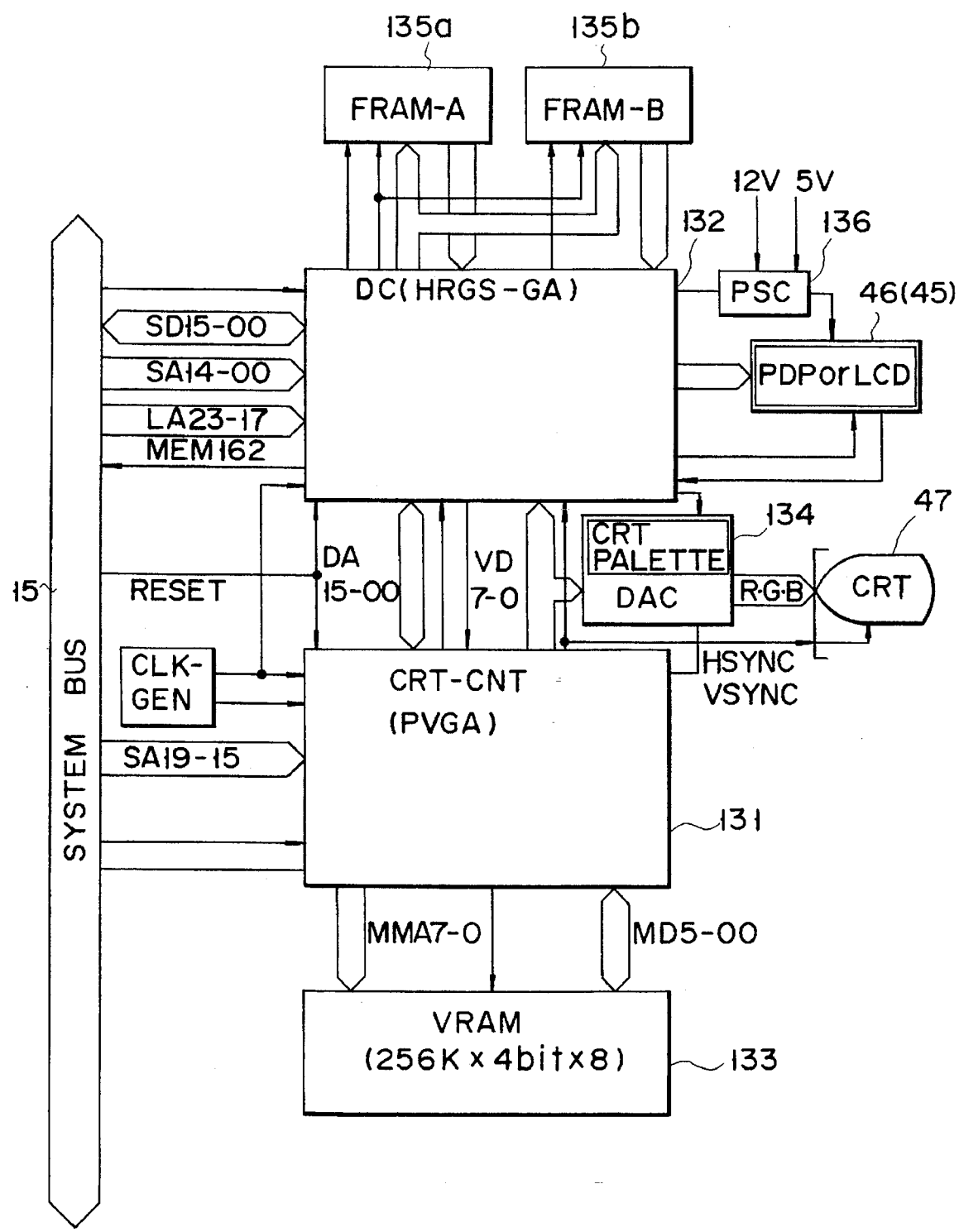
F I G. 2

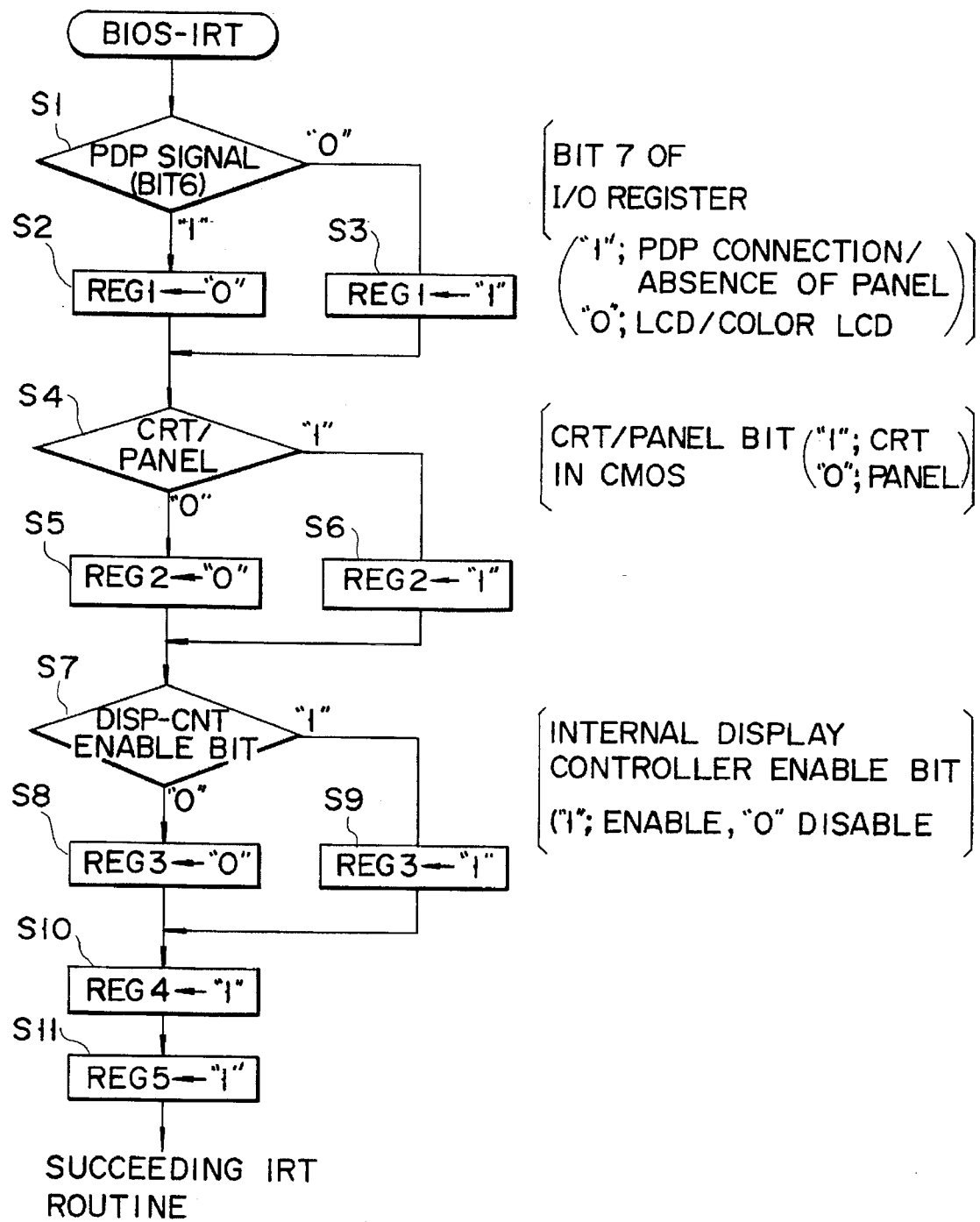
F I G. 4

|  | CRT LCD | CRT PDP | CRT | EXTERNAL |
|---|---|---|---|---|
| REG 1 | 1 | O | X | X |
| REG 2 | O | O | 1 | X |
| REG 3 | 1 | 1 | 1 | O |
| REG 4 | 1 | 1 | X | X |
| REG 5 | X | X | 1 | X |

F I G. 5

```
[[SYSTEM SETUP]]---------------- VERSION X.XX

1.  HARD RAM SIZE                    = 0 KB
2.  STANDARD MEMORY PORT ADDRESS     = 258H
3.  EXTENDING MEMORY PORT ADDRESS    = 208H
4.  RESUME FUNCTION                  = DISABLE
5.  PRT-A-B                          = PRT
6.  REVERSE DISPLAY                  = DISABLE
7.  AUTO DISPLAY-OFF TIME            = DISABLE
8.  DISPLAY MODE                     = VGA(NONE)
9.  INCORPORATED RS-232C PORT        = COM1
10. INCORPORATED MODEM               = ENABLE
11. INCORPORATED MODEM POWER         = OFF
12. LOW-BATTERY SPEAKER SOUND        = ENABLE
13. SYSTEM SPEAK SOUND               = ENABLE
14. PRINTER PORT TYPE                = OUTPUT MODE

[↑↓ ENTER] ITEM CHANGE  [-] CONTENT CHANGE
[F1] COMPLETION  [F5] STANDARD SETTING
[F10] WRITE CHANGED CONTENTS
```

F I G. 6

1

DISPLAY CONTROL SYSTEM

This application is a continuation of application Ser. No. 07/578,216, filed Sep. 6, 1990, now abandoned.

BACKGROUND OF THE INVENTION

1. Field of the Invention

The present invention relates to a display control system suited for use in a laptop type personal computer that, for example, incorporates a plurality of types of display drive circuits.

2. Description of the Related Art

Recently, a variety of portable laptop type personal computers operable by an internal battery have been developed. In order to expand applicable fields of these laptop type personal computers having improved performance characteristics, there is a positive demand to realize a display drive function capable of driving plural kinds of display devices. To satisfy this demand, it is essential for the laptop type personal computer to provide proper display control circuits for the display devices of the computer. More specifically, when driving a flat-panel display such as a plasma display (hereinafter referred to as PDP), a liquid crystal display (hereinafter referred to as LCD), and a CRT display, for example, the PDP and the CRT display can be controlled by common timing signals. On the other hand, the PDP and the LCD, both a flat-type display, have different display timing signals. For this reason, the PDP and the LCD must respectively have an independent display control circuits including display memories dedicated for the respective display units.

However, when the display control circuits for the above display units are incorporated in the computer, the LCD display control circuit not used is set in an operative mode even if the PDP is being driven. For this reason, wasteful power dissipation is caused by the LCD display control circuit. Particularly, when the computer is driven by the internal battery, the battery operation time is shortened. Furthermore, the flat panel display unit such as the PDP and the back-lit LCD requires a high voltage for illuminating the panel (a discharge voltage for the PDP and an electroluminescence (EL) drive voltage). For this reason, the drive power supply including the above high voltage circuit dissipates relatively large amount of power.

SUMMARY OF THE INVENTION

An object of the present invention is to provide a display control system which is used for a personal computer capable of driving plural kinds of display units, which excludes wasteful power in a display system dissipating a large amount of power in order to reduce the lead of a power supply and thus to prolong the battery operation time.

According to a first aspect of the present invention, a display control system comprises: first display control means for driving a first display unit using a specific display element; second display control means for driving a second display unit using a display element different from that of the first display unit; means for determining the use of the first display unit; means for supplying power to said first and second display units; and means for cutting off the power to be supplied to said first display unit when the determining means determines the non-use of the first display unit.

According to a second aspect of the present invention, a display control system comprises: first display control means including a display-data conversion table, for driving a first display unit using a specified display element; second display control means for driving a second display unit using a display element different from that of the first display unit; means for storing set data relating to the drive of the first display unit; means for supplying drive clock signals to the display data conversion table; and means for inhibiting the supplement of the drive clock signals to the display data conversion table in the first display control means when the set data designates a specific state.

According to a third aspect of the invention, a display control system comprises: first display control means including a digital-analog (D/A) converter, for driving a first display unit using a specific display element; a second display unit using a display element different from that of the first display unit; means for storing set data relating to the drive of the first display unit; means for supplying power to the D/A converter; and means for cutting off display signal current output from the D/A converter in the first display control means.

According to a fourth aspect of the present invention, a display control system comprises: first display control means for driving a first display unit using a specific display element; second display control means for driving a second display unit using a display element different from that of the first display unit; determining means for determining the use of the first display unit; means for supplying display drive system signal to the first display unit; and means for locking inoperative level the display drive system signal of the first display control means when the determining means determines the non-use of the first display unit.

According to a fifth aspect of the present invention, a display control system comprises: first display control means including a display memory, for driving a first display unit using a specific display element; second display control means for driving a second display unit using a display element different from that of the first display unit; determining means for determining the use of the first display unit; means for supplying display drive signal to the display memory; and means for locking inoperative level the display drive signal to be supplied to the display memory when the determining means determines the use of the first display unit.

According to a sixth aspect of the present invention, a display control method for a display system having at least a flat-panel display and a CRT display, comprising the steps of: (a) detecting a non-use state of the flat panel display; and (b) cutting off supplement of power to the flat-panel display unit when the flat panel display is not used.

According to a seventh aspect of the invention, a display control method for a display system at least having a flat-panel display and a CRT display controller including a CRT pallet and a D/A converter, comprising the steps of: (a) detecting non-use state of the CRT display; and (b) cutting off driving clock pulses to the CRT pallet when the CRT display is not used and cutting off reference current of a display signal output from the D/A converter.

According to an eighth aspect of the invention, a display control method for a display system having at least a flat panel display displaying the content of a display memory and a CRT display unit, comprises the steps of: detecting non-use state of the flat-panel display; and (b) locking a drive signal to be supplied to the display memory to a non-drive level when the flat-panel display is not in use.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a schematic block diagram of an embodiment of a personal computer to which a display control system of the present invention is applied;

FIG. 2 is a block diagram of the display controller shown in FIG. 1;

FIG. 4 is a flowchart showing an initialization routine;

FIG. 5 is a chart showing a correspondence between data to be set in registers REG1 through REG5 and types of display units;

FIG. 6 is an example of setup menu screen for setting a display auto off mode;

DETAILED DESCRIPTION OF THE PREFERRED EMBODIMENTS

Figure 3:
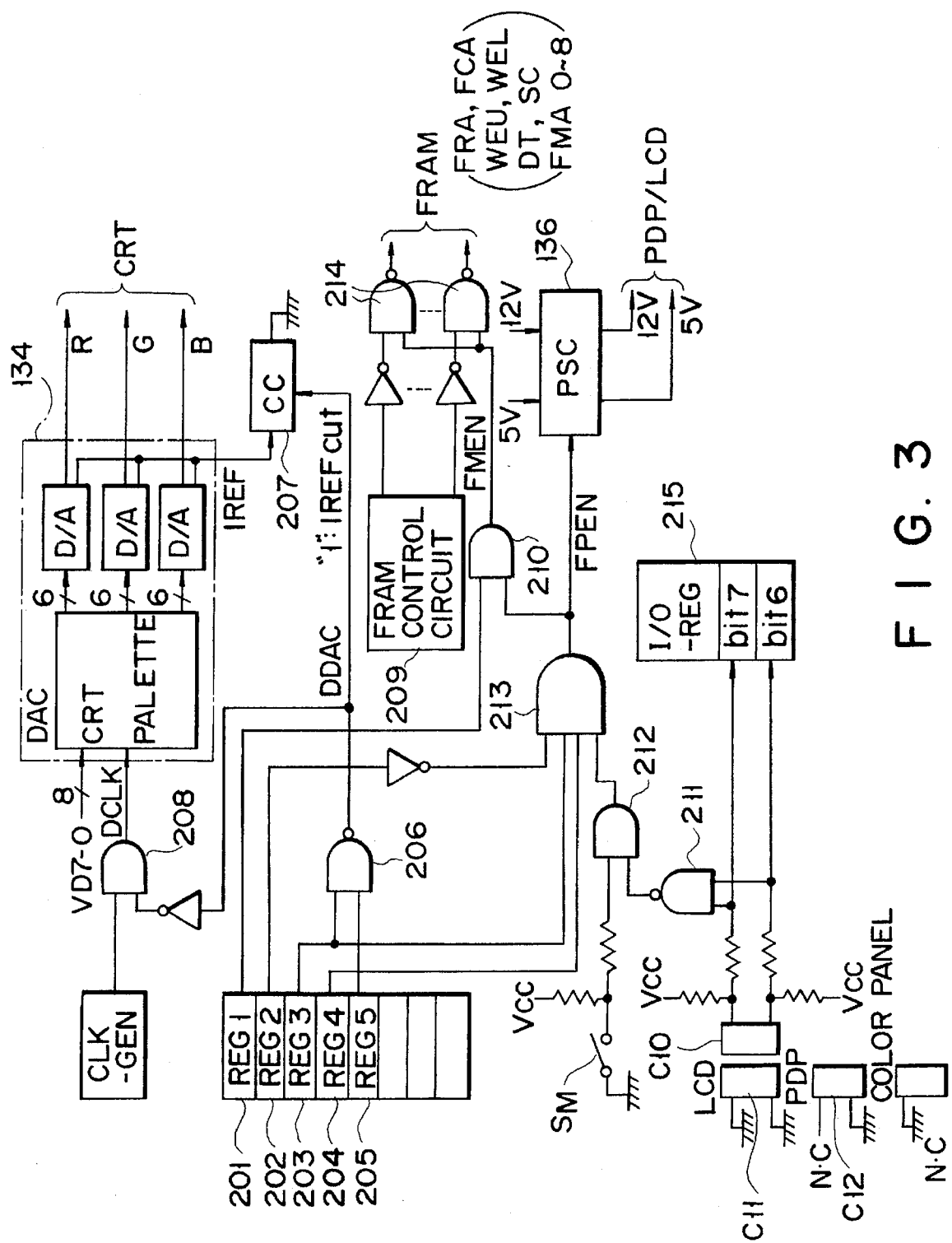
FIG. 3 is a detailed block diagram of the display function killer circuit provided in the display main controller shown in FIG. 2.

In FIG. 1, a central processing unit (CPU) 11 comprises a 32-bit CPU chip for example, which controls the entire operations of the display control system. The CPU 11 is connected to internal data buses 12 and 13. Internal bus comprises an internal data bus 12 and an internal address bus 13 of 24-bit width. A numerical data processor 14 is optionally connected to the internal data bus 12 via a connector. A system bus 15 comprises a data bus 15D of 16-bit width, a lower address bus 15L of 20-bit width, and an upper address bus 15U of 7-bit width. A bus-driver (BUS-DRV) 16 serves as an interface connecting the inner data buses 12 and 13 to the system bus 15. A bus-controller (BUS-CNT) 17 controls the system bus 15. A memory controller (MEM-CNT) 18 controls transfer of addresses between the lower address bus 15L and the upper address bus 15U, and simultaneously controls data reading/writing operations of main memory 19.

A BIOS-ROM 20 stores a basic input and output system program (BIOS). The BIOS includes an initialization routine as shown in FIG. 4. An input/output decoder (I/O DEC) 21 decodes an input/output (I/O) addresses on the system bus 15 and then transmits the decoded to addresses to the corresponding I/O chip. An input/output controller (I/O CONT) 22 controls input and output of data. A superintegration IC (SI) 23 incorporates a variety of I/O controllers including a floppy-disk interface, a hard-disc interface, a DMA controller, and an interrupt controller, or the like. A frequency controller (VFO) 24 generates clock pulses for a floppy-disk drive unit (FDD). A floppy-disk interface (FDD-I/F) 25 and a hard-disc drive interface (HD-I/F) 26 interface a floppy disk and a hard disc with the superintegration IC 23, respectively. A keyboard controller (KBC) 27 is connected to the system bus 15, whereas a keyboard scan controller (SCC) 28 is connected to the keyboard controller 27. A backup RAM (B-RAM) 29 is available for executing a resume function. An extension memory card (EXTM) 30 is optionally connected to extension memory card connectors C1 through C3. A clock module (RTC: real-time clock) 31 incorporates a dedicated drive battery and a memory (CMOS-RAM) backed up by this battery. An input/output port (PRT/FDD-I/F) 32 is connected to an I/O unit such as an external floppy-disc drive (FDD) and a printer (PRT). An interface unit RS-232C is connected to a serial I/O interface (SIO) 33.

An intelligent power supply unit (PS) 34 incorporating a power control CPU (PC-CPU) supplies a power for driving the system. A pair of main batteries (BT-L and BT-R) can be connected to the intelligent power supply unit (PS) 34. Under the control of the power control CPU (PC-CPU), the intelligent power supply unit 34 controls various driving power supplies. The respective power supply statuses are notified to the CPU 11 via the input/output controller 22. A display controller (DISP-CNT) 35 serves as a display sub system in the system. More specifically, the display controller 35 drives a flat panel display such as a plasma display (PDP), liquid crystal display (LCD) or a color panel (like color PDP or color LCD), and a CRT display (CRT). A variety of extension modules like the display controller 35 (serving as a display sub system) can be connected to an extension connector 36. A floppy disk drive 41 is incorporated into the system and is connected to the floppy disk drive interface 25. A hard disc drive (HDD) 42 is connected to the hard disc drive interface 26. A keyboard unit 43 is connected to the keyboard scan controller 28. A numeric key pad 44 is also connected to the keyboard scan controller 28. A back-lit LCD 45, a PDP 46, and a CRT 47 are each connected to the display controller 35. A flat panel display connector C10 is connected to the display controller 35. Either connector 11 of the LCD 45 or connector C12 of the PDP 46 is connected to the flat panel display connector C10. The flat panel display connector C10 is provided with two specified pins which generate signals for identifying the connected flat panel display. The signal identifying the connected display is read by the CPU 11 via the I/O register of the display controller 35. (See FIG. 3.)

FIG. 2 is a block diagram showing an arrangement of the display controller 35 shown in FIG. 1. A display main controller (CRT-CNT: PVGA) 131 has a display drive control function for driving the CRT 47 with high resolution. A display controller (DC, HRGS-GA) 132 is a display control section of a gate array structure, and comprises a bus-interface circuit exchanging through the system bus 15 data of various display control systems with data from the CPU 11, and various functional circuits controlling display of the LCD 45 and the PDP 46. The display controller 132 includes a display function killer circuit shown in FIG. 3. According to the state of the use of respective display units, the display function killer circuit selectively disables (locks to a non-driven level) the display drive function of the target display unit (including the flat panel display such as PDP, LCD, or color panel, and CRT display) to eliminate a wasteful power consumed by the display drive control circuits for the display units which are in the non-driven state. A combination of the display main controller (CRT-CNT: PVGA) 131 and the display controller 132 may be referred to as an internal display controller.

A display data memory 133 stores display data. When driving display of the CRT 47 or the PDP 46, the display main controller 131 accesses the display data memory 133 for reading display data. A CRT display data generator (DAC) 134 generates analog display data (R, G, and B) under the control of the display main controller 131. As shown in FIG. 3, the CRT display data generator 134 comprises a CRT pallet (lookup table) and three digital-analog (D/A) converters provided in correspondence with display three primary colors R, G, and G. A pair of frame memories 135a and 135b each having a pair of dual ports (asynchronous input/output) store display data of the LCD 45. The frame memories 135a and 135b are accessed by memory access signals output from an FRAM control circuit (209 shown in FIG. 3) of the display controller 132, where the memory access signal includes FRA (RAS), FCA (CAS), WEU (write enable upper), WEL (write enable lower), DT (data transfer), SC (serial clock), and FMA0-8 (memory address, 0-8). The frame memory 135a stores the upper half display data of the LCD display screen, whereas the frame memory 135b stores the lower half display data of the LCD display screen.

The display power supply control circuit (PSC) 136 comprises switching gate circuits. In response to flat-panel display enable signal (FPEN shown in FIG. 3) from the display controller 132, the display power supply control circuit 136 selectively controls supply of display drive power (12 VDC and 5 VDC) to the flat-panel displays such as the LCD 45 or the PDP 46. When the flat-panel display like the LCD 45 or the PDP 46 is not in use (FPEN="0"), the display power supply control circuit PSC 136 inhibits supply of display drive power (12 VDC and 5 VDC) to the flat panel display.

FIG. 3 is a circuit block diagram of the display function killer circuit in the display controller 132 shown in FIG. 2. According to the state of the use of respective controllable display units like the CRT display 47 and the flat panel display units like the LCD 45, PDP 46, or color panel, the display function killer circuit selectively disables (locks into a non-driven level) display drive function of the display units to prevent the power from wastefully being consumed by the display drive control circuits of the display units in the non-driven state.

Registers 201 through 205 are used to designate display condition and display mode set in the initialization routine (BIOS-IRT) shown in FIG. 4. The register 201 is used to designate the use mode of the LCD 45 ("1": LCD use mode). The register 202 is used to designate the use mode of the CRT 47 ("1": CRT use mode). The register 203 is used to designate enable/disable condition of the internal display controller set in the setup process ("1": enable). The register 204 is used designate enable/disable condition of the flat-panel display ("1": enable). The register 205 is used to designate enable/disable condition of the CRT display data generator (DAC) 134. The registers 204 and 205 are set to the enable ("1") condition as shown in FIG. 4 in the initialization. Thereafter, when the display auto off mode is set enabled in the setup process, and no key input operation within a period set by the setup process, the registers 204 and 205 are disabled ("0") under the control of the BIOS.

Correspondence between the display types and data set in the registers 201 to 205 is shown in FIG. 5. As shown in FIG. 5, when data is displayed on both the CRT 47 and the LCD 45, "1", "0", "1", and "1" are set in the registers 201 through 204, respectively. A mark "X" shown in the register 205 stands for "don't care". When data is displayed on both the CRT 47 and the PDP 46, only the value "1" of the register 201 is changed to "0", whereas the content of other registers 202 through 205 remains in the same state as those of the CRT 47 and the LCD 45. When data is displayed on the CRT 47 alone, the contents of the registers 201 and 204 turns into "don't care", whereas a value of "1" is set in other each of registers 202, 203, and 205.

When data is displayed on an externally connected display unit, all of the CRT 47, LCD 45, and the PDP 46 must be disabled, and therefore "0" is set in the register 203. (The internal display controller is disabled.) The contents of the remaining registers 201, 202, 204, and 205 are set to "don't care".

The display auto off mode automatically turns off the display when no key is actuated during a period set by a user in the setup processing. In order to set the display auto off mode, a setup menu screen as shown in FIG. 6 is displayed in the setup processing when the system is powered to urge the user to set the mode. The set items are displayed on the setup screen including a hard RAM size, a standard memory port address, an extended memory port address, a resume function, PRT-A-B, an inverse display, a display auto off time, a display mode, a built-in RS-232C port, a built-in modem, a built-in modem power, a low-battery speaker sound, a system speaker sound, and a printer port type.

An operator moves a cursor to the item to be changed by using an arrow key, and then, depresses a "-" key to enter the necessary character or numerical value to change the content. If the "F1" key is depressed, no change is made and the system setup processing is terminated. If the "F5" key is depressed, default values are set. If "F10" key is depressed, parameters set on the display are finally fixed. The setup relating to the present invention is the display auto off time. When the display auto off mode is set, the time is set on the setup screen during which no key operation is made. After the set time has elapsed while no key operation is made, the display is automatically turned off.

Figure 7:
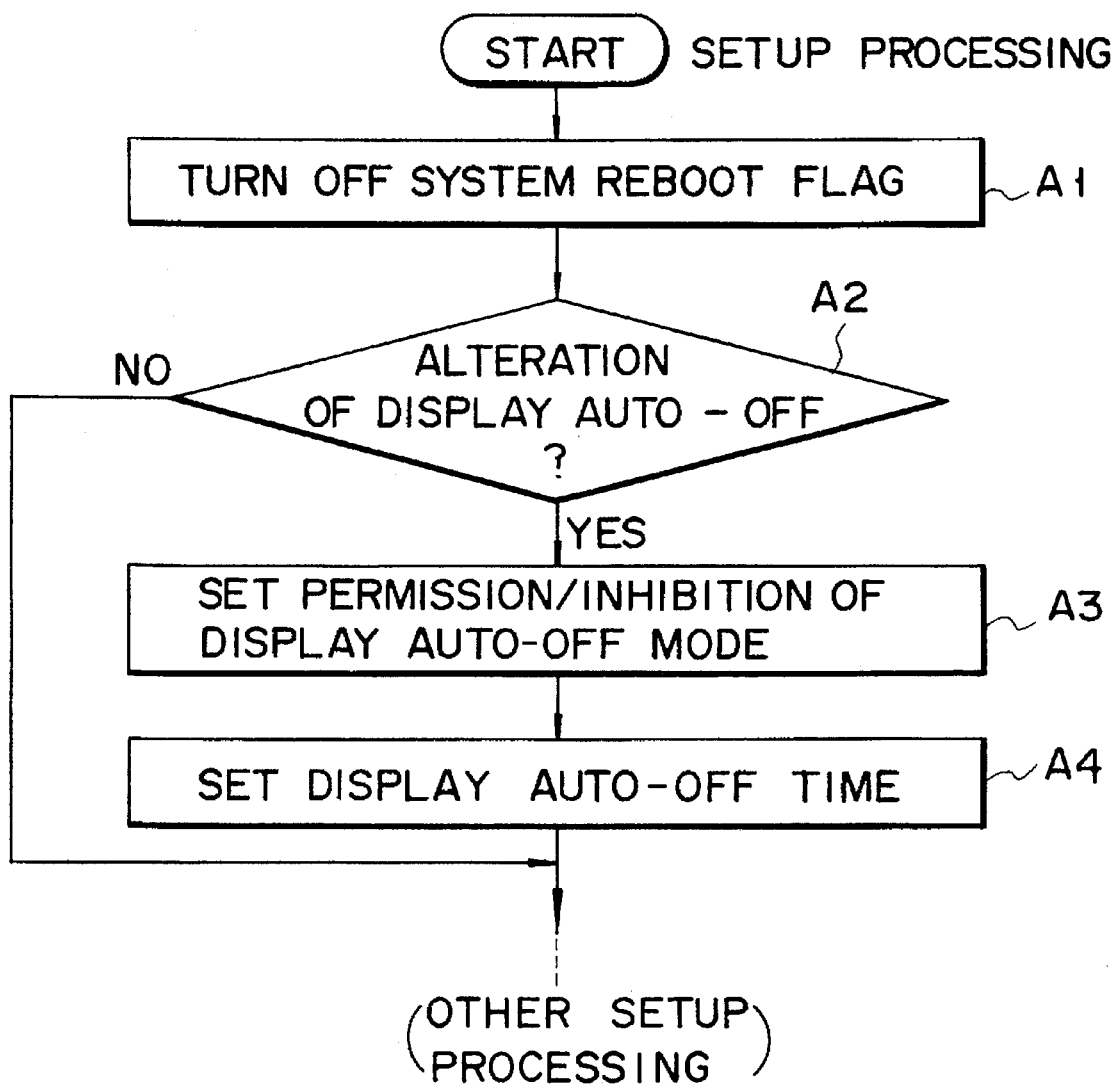
FIG. 7 is a flowchart showing a main part of the setup process routine.

The setup processing is shown in a flowchart of FIG. 7. Since only the display auto off is related to the present invention, only the portion thereof is shown in FIG. 7. The CPU 11 turns off, in step A1, the system reboot flag in order to disable the system reboot. More specifically, in this system, the CPU 11 refers to the system reboot flag after completing the setup process routine shown in FIG. 7, and performs the system reboot if the flag is ON. When the system reboot is performed, the BIOS in ROM 12 is executed to allow the CPU 11 to read the setup parameters stored in RAM 13. Therefore, in the initial step of the setup process routine, the system reboot flag is turned off.

In step A2, the CPU 11 determines if the display auto off time has been changed. If not, the CPU 11 executes other setup processes. If the time has been changed the CPU 11 sets, in step A3, the display auto off enable/disable flag in a general register (not shown) in the RAM 19. In this case, if no display auto off time is set, the display auto off mode is disabled. If any display auto off time is set, the display auto off mode is enabled. Then, the CPU 11 sets the display auto off time set by a user in the RAM 19 in step A4.

Figure 8:
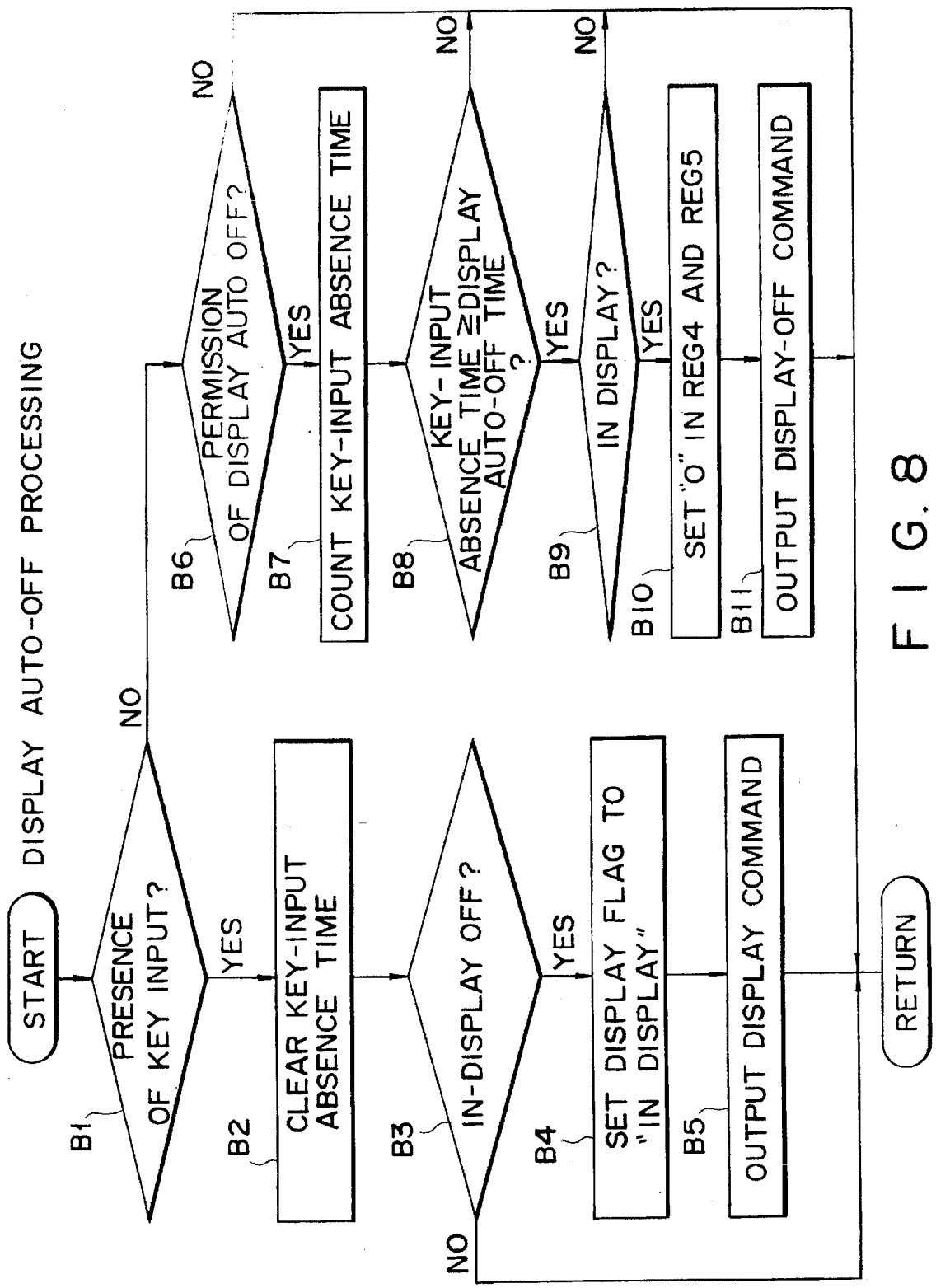
FIG. 8 is a flowchart showing a display auto off processing routine.

FIG. 8 shows a process routine of the display auto off mode. The CPU 11 determines, in step B1, if a key input is present. Upon determining the absence of the key input, the CPU 11 determines, in step B6, if the display auto off mode is enabled. If the mode is disabled, the CPU 11 returns to a main routine. If the mode is enabled, the CPU 11 counts the time during which no key input is present in step B7. Then, the CPU 11 determines, in step B8, if the counted value is larger than the time set in the RAM 19 in step A4 of FIG. 7. If the counted value is longer than the time in the RAM 19, the CPU 11 determines, in step B9, if the display operation is being executed. If the display operation is being executed, the CPU 11 sets, in step B10, "0" in the registers 204 and 205. Then, the CPU 11 transmits, in step B11, the display auto off command to the power control CPU (PC-CPU) in the power-supply circuit 34. On receipt of the display auto off command, the power control CPU stops the supply of power to the back light.

The NAND gate generates the reference current cut off enable signal (DDAC="1") except when the register 203 indicates the enable ("1") state of the internal display controller and the register 205 indicates enable state ("1") of the CRT display data generator (DAC) 134. A constant current circuit 207 is provided with a circuit for cutting off the reference current (IREF) flowing into the CRT display data generator (DAC) 134, when the reference current cutoff enable signal (DDAC="1") is output from the NAND gate 206. AND gate 208 inhibits display clocks (DCLK) to be supplied to the CRT display data generator (DAC) 134, when the reference current cutoff enable signal (DDAC="1") is output from the NAND gate 206. The frame control circuit (FRAM) 209 generates memory access signals including FRA (RAS), FCA (CAS), WEU (write enable upper), WEL (write enable lower), DT (data transfer), SC (serial clock), and FMA0-8 (memory address 0-8) to access-control the frame memories 135a and 135b. The AND gate 210 outputs the frame memory enable signal when the register 201 designates the use mode ("1") of the LCD 45 and the flat-panel display enable signal (FPEN="1") is output from the AND gate 213. The NAND gate 211 receives a state-determination signal indicating whether or not flat panel display is connected from the specified pin signals of the flat-panel display connector C10. The AND gate 212 outputs "1" level signal indicating that the flat panel display is in use when open/close switch SM of the flat panel display indicates that the panel cover is opened (switch off="1" output) and also the NAND gate 211 indicates the connected state ("1") of the flat panel display. The AND gate 213 outputs flat-panel display enable signal (FPEN="1"), when the register 202 indicates that the CRT mode is not set, and also when the register 203 indicates the enable state of the internal display controller, and when register 204 indicates the enable of the flat-panel display, and when the AND gate 212 indicates the in-use of the flat-panel display. The NAND gate 214 controls output of the memory access signals (FRA, FCA, WEU, DT SC, and FMA0-8) from the frame control circuit FRAM 209 in accordance with the frame memory enable signal (FMEN). The NAND gate 214 outputs the above memory access signals to the frame memories 135a and 135b, only when the frame memory enable signal (FMEN) is "1". The I/O register 215 can be accessed by the CPU 11, and latches at bits 6 and 7 the specified pin signals of the connector C10 connecting the flat-panel display. When the LCD 45 is connected to the connector C10 of the flat-panel display, the CPU 11 sets "0" to the bits 6 and 7 of the register 215. When the PDP 46 is connected to the connector C10, the CPU 11 sets "1" to the bit 7 and "0" to the bit 6. When the color panel is connected to the connector C10, the CPU 11 sets "0" to the bit 7 and "1" to the bit 6. When any flat-panel display is not connected, the CPU 11 sets "1" to the bits 6 and 7.

FIG. 4 is a flowchart showing a part of the initialization routine (BIOS-IRT) in BIOS-ROM 20. The CPU 11, determines, in step S1, if the PDP is connected in accordance with the bit 7 signal of the I/O register 215. The CPU 11 sets in steps S2 and S3, data corresponding to the determination of step S1. The CPU 11 determines, in step S4, if the CRT is enabled in accordance with the CRT/panel-bit signal of the setup data stored in the battery backup memory (CMOS-RAM) in the clock module (RTC) 31. The CPU 11 sets, in steps S5 and S6, data in the register 202 corresponding to the determination of step S4. The CPU 11 determines, in step S7, if the internal display controller enable bit signal of the setup data indicates the enable state. The CPU 11 sets, in steps S8 and S9, data in the register 203 corresponding to the determination of steps S8 and S9. The CPU 11 initializes the registers 204 and 205 to "1", in steps S10 and S11.

An operation of an embodiment of the present invention will now be described with reference to FIGS. 1 through 4. When the power is turned on, the initialization routine (BIOS-IRT) is stored in the BIOS-ROM 20 under the control of the CPU 11. In the initialization routine, process for setting the registers 201 through 205 in the display controller 132 is executed as shown in FIG. 4. More specifically, the CPU 11 determines, in step S1, if the PDP is connected from the bit 7 signal of the I/O register 215 (step S1). When the flat panel display (LCD 45 or a color panel) other than the PDP 46 is connected, the CPU 11 sets, in steps S2 and S3, "0" in the register 201, and "1" in the register 201 when the PDP 46 is connected. Then, the CPU 11 reads the CRT/panel bit of the setup data stored in the battery backup memory (CMOS-RAM) in the timer module (RTC) 31. If the bit indicates the use of the CRT ("1"), the CPU 11 sets "1" in the register 202, and if not, sets "0" in the register 202 (steps S4 to S6). Then, the CPU 11 reads the internal display controller enable bit of the above setup data. If the bit indicates the enable set state, the CPU 11 sets "1" in the register 203. If the bit indicates the disable set state, the CPU 11 sets "0" in the register 203 (steps S7 to S9). Then, the CPU 11 initializes the register 204 indicating the disable/enable of the flat panel display and the register 205 indicating the disable/enable of the DAC 134 to "1" (steps S10 and S11).

As described above, the registers 201 to 205 in the display controller 132 are set by the initialize routine (BIOS-IRT). Data set in the registers 201 through 205 is used for the display function killer circuit which eliminates wasteful power otherwise to be consumed by the display drive control circuit of a not-driven display unit. More specifically, the signal from the register 201 is delivered to the AND gate 210. The signals from the registers 203 and 204 are supplied to the AND gate 213. Furthermore, the signal from the register 202 is inverted by an inverter and then supplied to the NAND gate 206.

Except for such cases in which the register 203 designates enable condition ("1") of the internal display controller and the register 205 designates enable condition ("1") of the CRT display data generator (DAC) 134, the NAND gate 206 outputs the reference current cutoff enable signal (DDAC="1") to constant current circuit 207.

On receipt of the reference current cutoff enable signal from the NAND gate 206, the constant current circuit 207 cuts off the reference current (IREF) flowing into the CRT display data generator (DAC) 134. Simultaneously, AND gate 208 inhibits the display clock (DCLK) from being supplied to the CRT display generator (DAC) 134, in response to the reference current cutoff enable signal (DDA="1").

Accordingly, the display clocks (DCLK) are not supplied to the CRT pallet (lookup table) of the CRT display data generator (DAC) 134. Furthermore, no generating current of display signals (R, G, and B) flow into the digital-analog (D/A) converters for respective color components R, G, and B. As a result, driving currents for the D/A converters and the CRT palette are extremely reduced, resulting in a large reduction of the power dissipation of the CRT display data generating section (DAC) 134.

Even when the CRT display 47 is driven by the internal display controller 35, if the display auto off mode is set enabled during the setup process, unless a key input is present via the keyboard unit 43 within the predetermined time, the register 205 is set to "0". As a result, the AND gate 206 outputs the reference current cutoff enable signal (DDAC="1") in order to inhibit the supply of the display clocks (DCLK) to the CRT display data generator (DAC) 134, resulting in the reference current (IREF) being cut off.

As described above, when the CRT display 47 is driven by the use of the internal display controller 35, the display clock (DCLK) is selectively supplied to the CRT display data generator (DAC) 134 except that the display auto off mode is enabled. Thus, the analog display signals R, G, and B with potentials corresponding to the display contents are generated. On the other hand, when the display auto off mode is enabled, the supplement of the display clocks (DCLK) to the CRT display data generator (DAC) 134 is cut off. Furthermore, current paths for generating R, G, and B signals are gated. In consequence, the CRT display data generator (DAC) 134 enters into the least power consuming state very close to the state of fully cutting off the power supply.

The AND gate 213 outputs the flat panel display enable signal (FPEN="1") only when the register 202 designates the non-CRT mode; the register 203 designates the enable condition of the internal display controller; the register 204 designates the enable condition of the flat-panel display; and the AND gate 212 designates the use of the flat-panel display. The output of the AND gate 213 is supplied to the AND gate 210 and the display power supply control circuit (PSC) 136.

In accordance with the signal output from the AND gate 213, the display power supply control circuit (PSC) 136 controls the drive power supply (DC 12 V and DC 5 V) of the flat panel display such as the LCD 45 and PDP 46. More specifically, the display power supply control circuit (PSC) 136 supplies the power (DC 12 V and DC 5 V) to the flat panel display such as the LCD 45 or the PDP 46 only when receiving "1" level flat-panel display enable signal (FPEN= "1") from the AND gate 213 for indicating that the flat panel display such as the LCD 45 or the PDP 46 is in use. In this case, using the DC 12 V power supply generates either a high-voltage power for the back light of the LCD 45 or a high-voltage discharge power for the PDP 46. On the other hand, the display power supply control circuit (PSC) 136 cuts off the supplement of driving power (DC 12 V and DC 5 V) to the LCD 45 or the PDP 46 when the flat panel display such as the LCD 45 or the PDP 46 is not in use and "1" level flat-panel display enable signal (FPEN="1") is not output from the AND gate 213. Furthermore, even when the conditions of using the flat panel display are properly arranged, if the display auto off function is activated as a result of no key-input operation, the value of the register 204 turns into "0" to cause the AND gate 213 to output value "0". As a result, supply of the driving power (12 VDC and 5 VDC) to the LCD 45 and the PDP 46 is cut off.

As described above, when the use condition of the flat panel display is not yet properly arranged, supply of the driving power (12 VDC and 5 VDC) to the display drive circuits for the LCD 45 and PDP 46 is cut off. Accordingly, the supply of power to the circuits including high-voltage driving power generating circuit (DC-DC converter) consuming much power is cut off. As a result, wasteful power consumption of flat panel display such as LCD 45 and PDP 46 which are not in use can be prevented.

The register 210 outputs frame memory enable signal (FMEN="1") so that the AND gate 214 can be opened only when the register 201 designates the use ("1") of the LCD 45 and also when the flat-panel display enable signal (FPEN="1") is output from the AND gate 213. Accordingly, the respective memory access signals generated by the frame control circuit (FRAM) 209 such as FRA (RAS), FCA (CAS), WEU (write enable upper), WEL (write enable lower), and FMA0-8 (memory address 0-8) are output to the frame memories 135a and 135b via the AND gate 214. When the LCD 45 is not used and the AND gate outputs "0", the AND gate 214 is closed to lock every memory access signal generated by the frame control circuit (FRAM) 209 to the non-driven level ("1"=Vcc level). As a result, wasteful power consumption caused by access driving of the frame memories 135a and 135b can be prevented.

As described above, an arrangement where the nonuse state of the LCD 45 is determined by a plurality of condition signals and the display drive signals of the LCD 45 are locked to the non-driven level in accordance with the determination. As a result, wasteful consumption of power of the LCD 45 when it is not used can be prevented. Thus, the power dissipation by the battery operation can be reduced drastically, resulting in a prolonged battery operation time.

The provision of the display function killer circuit shown in the above embodiment can selectively lock the display drive circuits of the display units such as a CRT and the flat panel display of a PDP, LCD, or a color panel to the non-driven level according to the use of the respective display units. As a result, wasteful power consumed by the drive circuit of the display which is not used can be eliminated, resulting in prolonged battery operation time.

Note that the arrangement of the display controller 35 including the display function killer circuit is not limited to the embodiment shown in FIGS. 2 and 3. However, the condition signals and the target circuits to be controlled can be arbitrarily changed depending on the system arrangement.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A display control system comprising:
   first display control means for driving a flat panel display unit using a specific display element, the flat panel display unit including at least a liquid crystal display (LCD) or a color panel;
   second display control means for driving a CRT display unit using a display element different from that of the flat panel display unit;
   means for generating at least one of a first signal indicating whether or not said CRT display unit is in use, a second signal indicating an enable or a disable state of said flat panel and said CRT display control means, a third signal indicating an enable or a disable state of said flat panel display unit, and a fourth signal indicating whether or not said flat panel display unit is in use;
   determining means for determining whether the flat panel display unit is in use according to at least one of the first through fourth signals;

means for detecting which one of said LCD, and said color panel is connected to said display control system, the detecting means comprising a connector, and specified pins indicating types of flat panel display being assigned to said connector;

means for supplying power to said flat panel display unit; and means for cutting off power for said flat panel display unit, when either the detecting means detects that the flat panel display is not connected to the display control system, or said determining means determines that the flat panel display unit is not in use.

2. The system according to claim 1 further comprising:

means for setting a display auto off mode in which a supplement of power to said flat panel display unit is cut off to be enabled or disabled when no data is input during a predetermined period of time; and means for disabling the first signal when no data is input during the predetermined period of time while the display auto off mode is set to be enabled.

3. The system according to claim 1, wherein said means for detecting which one of said LCD, PDP, or color panel, is connected to said display control system further comprises means for detecting that none of the flat panel displays is connected to said display control system.

4. The system according to claim 1, wherein said means for cutting off the power to be supplied to said flat panel display unit includes means for cutting off logic operating power to be supplied to said flat panel display unit.

5. The system according to claim 1, wherein the power is a voltage to drive illumination of the LCD.

6. The system according to claim 1, wherein the power is a voltage for driving the flat panel display unit.

7. The system according to claim 1, further comprising means for generating a second signal indicating whether or not the flat panel display unit is in use, and said detecting means detects which one of said LCD, said PDP, and said color panel is connected according to the second signal.

8. The system according to claim 7, wherein said flat panel display unit has a panel cover which can freely by opened and closed, said system further comprising:

second detecting means for detecting an open or closed condition of said panel cover; and means for outputting the second signal when said panel cover remains open and said flat panel units are connected to said display control system.

9. The system according to claim 1 wherein the signal generating means further generates a third signal indicating whether or not said CRT display unit is in use, and a fourth signal indicating an enable or a disable state of said first and second display control means, and wherein said determining means determines the non-use state of the flat panel display unit according to at least one of the first, the third and the fourth signals.

10. The system according to claim 9, wherein said means for generating the first, the third and the fourth signals generates the first, the third and the fourth signals based on data set in the setup process.

11. A display control system comprising:

a RAMDAC comprised of a digital/analog (D/A) converter and a display data conversion table for generating analog display data;

first display control means for driving a flat panel display using a specific display element;

means for storing set data relating the drive of said flat panel display, the set data including a signal indicating either an enable or a disable condition of the RAMDAC;

second display control means for driving a CRT display using a display element different from that of the flat panel display, the second display control means controlling the CRT display using the RAMDAC;

means for supplying power to the D/A converter and a drive clock to the display data conversion table; and means for cutting off a reference current of display signal output of said D/A converter and inhibiting supply of the drive clock to the display data conversion table, when the set data stored in the storing means indicates a disable condition.

12. The system according to claim 11, wherein the set data includes a further signal indicating either an enable" or a "disable" condition of said first display control means, and wherein said means for cutting off the reference current cuts off the reference current of display signal of said D/A converter except when said first and second display control means are enabled.

13. The system according to claim 11, further comprising means for setting ad display auto off mode in which the supplement of power to said flat panel display is cut off to be enabled or disabled, and wherein said inhibiting means includes means for disabling the signal indicating either an enable or a disable condition of the RAMDAC when no data is input during a predetermined period of time while the display auto off mode in enabled.

14. The system according to claim 11, wherein said digital-analog (D/A) converters are respectively provided for three primary colors of red, green and blue.

15. The system according to claim 11, wherein said flat panel display is a liquid crystal display.

16. The system according to claim 11, wherein said flat panel display is a plasma display.

17. The system according to claim 11, wherein said flat panel display is a color panel.

18. A display control system comprising:

first display control means, including a display data conversion table, for driving a flat panel display using a specified display element;

second display control means for driving a CRT display using a display element different from that of said flat panel display;

means for storing set data relating to the driving of said flat panel display, the set data including a signal indicating either an enable or a disable of condition of said display data conversion table;

means for supplying a drive clock to said display data conversion table; and means for inhibiting supply of the drive clock to said display data conversion table of said first display control means when the set data stored in the storing means indicates a disable of condition.

19. The system according to claim 18, further comprising means for setting a display auto off mode in which the supplement of power to said flat panel display is cut off to be enabled or disabled, and wherein said means for inhibiting the supplement of the drive clock further comprises means for disabling the signal when to data is input during the predetermined period of time while the display auto off mode is enabled.

20. The system according to claim 18, wherein said flat panel display is a liquid crystal display.

21. The system according to claim 18, wherein said flat panel display is a plasma display.

22. The system according to claim 18, wherein said flat panel display is a color panel.

23. The system according to claim 18, wherein said display data conversion table is a CRT palette.

24. A display control system comprising:

first display control means including a display data conversion table and a digital/analog (D/A) converter, for driving a flat panel display using a specific display element;

second display control means for driving a CRT display using a display element different from that of said flat panel display;

determining means for determining whether said flat panel display is in use;

means for supplying power to said flat panel display and CRT display;

means for cutting off power to be supplied to said flat panel display when said determining means determines that said flat panel display is not in use;

means for storing set data related to the driving of said flat panel display;

means for supplying a clock pulse to said display data conversion table;

means for supplying power to said digital/analog (D/A) converter;

means for supplying a display drive signal to said flat panel display;

means for cutting off the power supply to said D/A converter and the supply of the clock pulse to said display data conversion table when said set data indicates a specific condition; and means for locking the display drive signal to a non-driven level when said determining means determines that said flap panel display is not in use.

25. A display control system comprising:

flat panel display control means for driving a flat panel display unit using a specific display element;

CRT display control means for driving a CRT display unit using a display element different from that of said flat panel display unit;

storage means for storing an enable or a disable state of the flat panel display unit, the enable or disable state of said flat panel display unit being set in a setup process;

means for generating at least one of a first signal indicating whether or not said CRT display unit is in use, a second signal indicating an enable or disable state of said flat panel display control means and said CRT display control means, a third signal indicating an enable or a disable state of said flat panel display unit, and fourth signal indicating whether or not said flat panel display unit is in use;

determining means for determining the enable or disable state of the flat panel, display unit in accordance with the enable or the disable state stored in said storage means, and for determining a non-use state of said fiat panel display unit when said generating means generates at least one of the first signal indicating the non-use of said CRT display unit, the second signal indicating the disable state of said flat panel display control means, the third signal indicating the disable state of said flat panel display unit, the fourth signal indicating the non-use of said flat panel display unit; and means for cutting off power supplied to said flat panel display unit when said determining means determines the disable state or the non-use state of the flat panel display unit according to at least one of the first through fourth signals.

26. The system according to claim 25, further comprising:

means for setting a display auto off mode in which the supply of power to said flat panel display unit is cut off to be enabled or disabled when no data is input during a predetermined period of time; and means for disabling the third signal when no data is input during the predetermined period of time while the display auto off mode is set to be enabled.

27. The system according to claim 26, wherein said means for cutting off power to be supplied to said flat panel display unit comprises means for cutting off power used to generate panel-illuminating voltage for said flat panel display unit.

28. The system according to claim 28, wherein said flat panel display is a liquid crystal display.

29. The system according to claim 28, wherein said LCD incorporates a back light, and said panel illuminating voltage is a voltage for driving electroluminescence.

30. The system according to claim 27, wherein said flat panel display is a plasma display.

31. The system according to claim 30, wherein the panel illuminating voltage is a discharge voltage.

32. The system according to claim 29, wherein said flat panel display is a color panel.

33. The system according to claim 25, wherein said flat panel display unit has a panel cover which can freely be opened and closed, said system further comprising:

means for detecting an open or closed condition of said panel cover;

means for detecting whether said flat panel display unit is connected to said display control system; and means for outputting the fourth signal indicating that said flat panel display unit is in use when said panel cover remains open and said flat panel display unit is connected to said display control system.

34. The system according to claim 25, wherein said flat panel display at least includes a liquid crystal display (LCD), a plasma display (PDP), and a color panel, wherein said system further comprises:

means for detecting which one of said LCD, said PDP, and said color panel is connected to said display control system; and means for holding the detected data.

35. The system according to claim 34, wherein said means for detecting which one of said LCD, said PDP, and said color panel is connected to said display control system, further comprising means for detecting that none of the flat panel displays is connected to said display control system.

36. The system according to claim 34, wherein said detection means comprises a connector, and wherein specified pins indicating types of said flat panel display are assigned to said connector.

37. The system according to claim 25, wherein said means for generating the first through fourth signals generates said first through fourth signals based on data set in a setup process.

* * * * *

UNITED STATES PATENT AND TRADEMARK OFFICE
CERTIFICATE OF CORRECTION

PATENT NO. : 5,629,715
DATED : May 13, 1997
INVENTOR(S) : Hiroki ZENDA

It is certified that error appears in the above-indentified patent and that said Letters Patent is hereby corrected as shown below:

Title page, item [57], line 12 of abstract, after "enabled" insert --,or an internal display controller is disabled--.

Claim 8, column 11, line 39, "by" should read --be--.

Claim 13, column 12, line 20, "ad display" should read --a display--.

Claim 24, column 13, line 34, "flap" should read --flat--.

Claim 28, column 14, line 18, "claim 28" should read --claim 27--.

Signed and Sealed this

Fifth Day of May, 1998

BRUCE LEHMAN

*Attest:*

*Attesting Officer*           *Commissioner of Patents and Trademarks*